(12) United States Patent
Lin et al.

(10) Patent No.: US 9,299,164 B2
(45) Date of Patent: Mar. 29, 2016

(54) METHOD AND APPARATUS FOR USING SUPER RESOLUTION ENCODING TO PROVIDE EDGE ENHANCEMENTS FOR NON-SATURATED OBJECTS

(71) Applicant: Xerox Corporation, Norwalk, CT (US)

(72) Inventors: Guo-Yau Lin, The Woodlands, TX (US); Stephen Robert Dashiell, Pasadena, CA (US); Farzin Blurfrushan, Torrance, CA (US); Katherine Loj, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/338,010

(22) Filed: Jul. 22, 2014

(65) Prior Publication Data

US 2016/0027189 A1 Jan. 28, 2016

(51) Int. Cl.
*G06T 7/40* (2006.01)
*G06T 7/00* (2006.01)

(52) U.S. Cl.
CPC .............. *G06T 7/408* (2013.01); *G06T 7/0083* (2013.01)

(58) Field of Classification Search
CPC ......... G06T 5/30; G06T 5/008; G06T 7/0085; G06T 2207/20012; G06T 2207/20192; G06T 2207/30176; G06T 2207/20148; G06T 7/408; G06T 7/0083
USPC ......... 382/266, 269, 199, 103, 107, 254, 256, 382/258
See application file for complete search history.

(56) References Cited

U.S. PATENT DOCUMENTS

| | | | | |
|---|---|---|---|---|
| 5,504,319 | A * | 4/1996 | Li | G06K 7/1456 235/462.08 |
| 6,606,420 | B1 * | 8/2003 | Loce | G06T 5/30 382/199 |
| 6,665,439 | B1 * | 12/2003 | Takahashi | G06K 9/0063 382/165 |
| 7,636,480 | B2 | 12/2009 | Zhang et al. | |
| 2006/0132753 | A1 * | 6/2006 | Nichols | G01S 13/865 356/5.07 |
| 2007/0252838 | A1 * | 11/2007 | Hains | G06K 15/02 345/467 |
| 2007/0279652 | A1 * | 12/2007 | McElvain | H04N 1/4055 358/1.9 |
| 2008/0144057 | A1 * | 6/2008 | McElvain | H04N 1/4055 358/1.9 |
| 2009/0238489 | A1 * | 9/2009 | Metcalfe | H04N 1/40081 382/266 |
| 2010/0061638 | A1 * | 3/2010 | Tanaka | 382/199 |
| 2014/0254950 | A1 * | 9/2014 | Blurfrushan | G06T 9/00 382/244 |

* cited by examiner

*Primary Examiner* — Mekonen Bekele (57) ABSTRACT

A method, non-transitory computer readable medium, and apparatus for enhancing an edge of a non-saturated object are disclosed. For example, the method detects a plurality of transition pixels, determines a gray value for one or more of the plurality of transition pixels is greater than a threshold value, identifies one or more edge pixels from the one or more of the plurality of transition pixels that has the gray value greater than the threshold value when the one or more of the plurality of transition pixels is not within an input block of pixels having all of the pixels in the input block with a respective gray value greater than the threshold and applies an edge enhancement to each one of a plurality of input blocks containing the one or more edge pixels.

16 Claims, 6 Drawing Sheets

| SRE PATTERN | GRAY CODE | SRE PATTERN | GRAY CODE | SRE PATTERN | GRAY CODE |
|---|---|---|---|---|---|
|  | 0 |  | 68 |  | 136 |
|  | 17 |  | 85 |  | 153 |
|  | 34 |  | 102 |  | 170 |
|  | 51 |  | 119 |  | 187 |

| GRAY CODE | SRE PATTERN |
|---|---|
| 204 |  |
| 221 |  |
| 238 |  |
| 255 |  |

METHOD AND APPARATUS FOR USING SUPER RESOLUTION ENCODING TO PROVIDE EDGE ENHANCEMENTS FOR NON-SATURATED OBJECTS

The present disclosure relates generally to improving image quality and, more particularly, to a method and apparatus for enhancing an edge of a non-saturated object.

BACKGROUND

The appearance of text and graphics is important to users that print documents. Some printing technologies use a greater resolution to provide an appearance of smoother edges on objects. However, a drawback of a high resolution is the amount of storage and computational power required to process high resolution images.

Some available methods address the issue of a lack of storage and computational power availability by compressing the image. However, some of these methods are only available for objects that are fully saturated. Currently, for unsaturated objects, methods such as anti-aliasing for example would provide some improvement, but will lose the sharpness of the edge pixels.

SUMMARY

According to aspects illustrated herein, there are provided a method, a non-transitory computer readable medium, and an apparatus for enhancing an edge of a non-saturated object. One disclosed feature of the embodiments is a method that detects a plurality of transition pixels, determines a gray value for one or more of the plurality of transition pixels is greater than a threshold value, identifies one or more edge pixels from the one or more of the plurality of transition pixels that has the gray value greater than the threshold value when the one or more of the plurality of transition pixels is not within an input block of pixels having all of the pixels in the input block with a respective gray value greater than the threshold and applies an edge enhancement to each one of a plurality of input blocks containing the one or more edge pixels.

Another disclosed feature of the embodiments is a non-transitory computer-readable medium having stored thereon a plurality of instructions, the plurality of instructions including instructions which, when executed by a processor, cause the processor to perform an operation that detects a plurality of transition pixels, determines a gray value for one or more of the plurality of transition pixels is greater than a threshold value, identifies one or more edge pixels from the one or more of the plurality of transition pixels that has the gray value greater than the threshold value when the one or more of the plurality of transition pixels is not within an input block of pixels having all of the pixels in the input block with a respective gray value greater than the threshold and applies an edge enhancement to each one of a plurality of input blocks containing the one or more edge pixels.

Another disclosed feature of the embodiments is an apparatus comprising a processor and a computer readable medium storing a plurality of instructions which, when executed by the processor, cause the processor to perform an operation that detects a plurality of transition pixels, determines a gray value for one or more of the plurality of transition pixels is greater than a threshold value, identifies one or more edge pixels from the one or more of the plurality of transition pixels that has the gray value greater than the threshold value when the one or more of the plurality of transition pixels is not within an input block of pixels having all of the pixels in the input block with a respective gray value greater than the threshold and applies an edge enhancement to each one of a plurality of input blocks containing the one or more edge pixels.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for enhancing an edge of a non-saturated object. As discussed above, the appearance of text and graphics is important to users that print documents. Some printing technologies use a greater resolution to provide an appearance of smoother edges on objects. However, a drawback of a high resolution is the amount of storage and computational power required to process high resolution images.

One technique used for compressing objects while maintaining a smoothness of edges on objects is super resolution encoding (SRE) disclosed in U.S. Pat. No. 7,636,480 assigned to Xerox® Corporation and the disclosure of which is herein incorporated by reference in its entirety. However, SRE was previously only applied to fully saturated objects. In other words, SRE was not applied to non-saturated objects in contone. SRE uses input blocks based on all combinations of pixel being fully on or off. However, with non-saturated images the number of possible combination of input blocks used for SRE becomes almost infinite due to the varying degrees of gray levels in each pixel of an input block. In addition, if the object is too light, applying a fully saturated SRE edge enhancement to the light object may create an appearance of a border which may be undesirable.

One embodiment of the present disclosure addresses this problem by applying SRE to edge pixels of an unsaturated object only if a gray value of the edge pixel is greater than a threshold value. SRE edge enhancement is applied at a fully saturated level to eliminate the high computational costs associated with pattern matching of input blocks for SRE for all possible gray values. In addition, SRE edge enhancement is done at saturated levels due to limitation of encoding bits for SRE gray values in certain instances (e.g., when using 8 bits). As a result, SRE edge enhancement may be applied to edge pixels of certain unsaturated objects that are dark enough without creating the appearance of a border.

Figure 1:
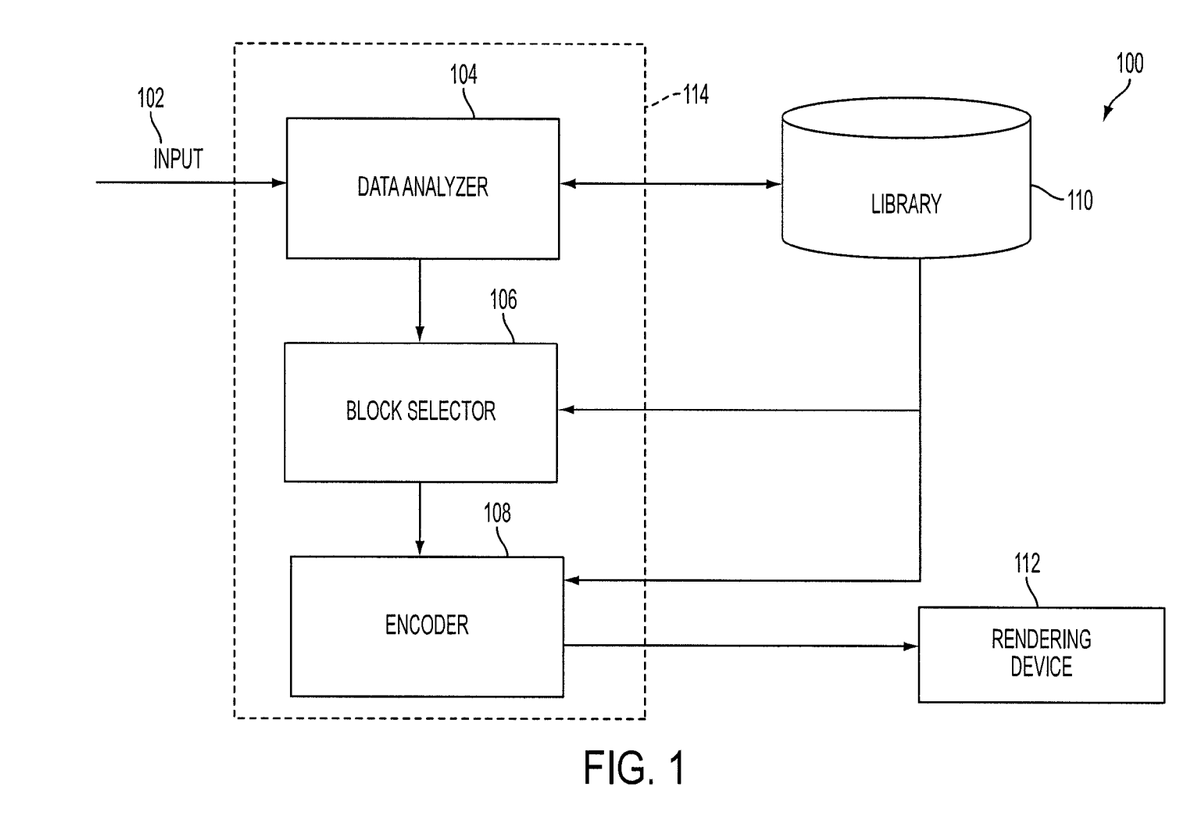
FIG. 1 illustrates an example block diagram of a system of the present disclosure.

FIG. 1 illustrates an example system 100 of the present disclosure. In one embodiment, the system 100 may include a data analyzer 104, a block selector 106, an encoder 108, a library 110 and a rendering device 112. In one embodiment, the data analyzer 104, the block selector 106 and the encoder 108 may be part of a single apparatus or hardware processing device 114.

In one embodiment, an input 102 may be fed to the data analyzer 104. The input 102 may be a high resolution image or document having one or more unsaturated objects. In other words, the objects may have a gray value that is not fully on. Said another way the objects may include 7 contone objects.

In one embodiment, the examples below are related to an object having 8 bits per pixel. Thus, each pixel of the unsaturated object may have a gray value between 0 and 254, with a fully saturated pixel having a gray value of 255. Although an example using 8 bits per pixel is included in the example, it should be noted that the present disclosure may be applied to any contone applications.

In one embodiment, a gray value may be stored in a tag. The tag may be a separate entity than the pixel that describes properties of the pixel. For example, the tag may indicate if the pixel is part of an image, text or other special object such as an SRE pixel. In one embodiment, the tag may be 4 bits. However, it should be noted there is no restriction on the number of bits for the tag and that any number of bits may be used to store the tag.

In one embodiment, the data analyzer 104 may be used to analyze the input 102 on a pixel-by-pixel and a line-by-line basis. For example, the data analyzer 104 may analyze the unsaturated object beginning with an uppermost and left most pixel and scan each pixel in a line, one line at a time. During the analysis, the data analyzer 104 may identify one or more transition pixels.

In one embodiment, a transition pixel may be defined broadly as a pixel that has a respective gray value greater than a gray value of an adjacent pixel. More specifically, a transition pixel may be defined as a pixel as a pixel having a gray value greater than zero that immediately follows or precedes a pixel having a gray value of zero. In other words, transition pixels are pixels that have a gray value greater than zero and are adjacent to another pixel having a gray value of zero. In one embodiment, the image may be analyzed to detect a plurality of transition pixels.

Once the transition pixels are identified, the data analyzer 104 may analyze each one of the transition pixels to determine if the transition pixel is an edge pixel. In one embodiment, to receive edge enhancement using SRE, for example, the transition pixel must be an edge pixel. In one embodiment, edge pixels may have a gray value that is greater than a threshold value and also not be part of an input block that has all of its pixels turned on.

In one embodiment, the threshold value may be user defined. The threshold value may be a gray value that is determined to be dark enough such that providing edge enhancement may not appear as a border around the object. In one embodiment, the threshold value may be a gray value of 210 for an 8 bit pixel. It should be noted that threshold value may be adjusted accordingly for pixels with more or less bits having a smaller or wider range of gray values and that the threshold value may be any value depending on a particular application.

In another embodiment, multiple levels of edge enhancement may be applied. As a result, a second threshold value may be used for higher levels of edge enhancement. In one embodiment, the threshold value may be a gray value of 165 for an 8 bit pixel. For example, the user may be presented with a print options screen that allows a user to select a medium edge enhancement (e.g., setting the threshold value to 210) or a high edge enhancement (e.g., setting the threshold value to 165).

As noted above, to be an edge pixel, the transition pixel must also not be part of an input block that has all of its pixels turned on. In one embodiment, "turned on" may be defined as having a gray value greater than the threshold value. For example, consider an input block consisting of a 2 pixel×2 pixel block. One of the pixels may have been identified as a transition pixel and has a gray value greater than the threshold value. However, if all of the remaining three pixels also have a gray value greater than the threshold value then all of the pixels are considered to be on and the transition pixel would not be identified as an edge pixel. Said another way, at least one pixel within the input block must have a gray value that is less than the threshold value. In another embodiment, at least one pixel within the input block must have a gray value of zero.

In one embodiment, it may be desired to allow transition pixels that have all pixels with a gray value greater than the threshold value to be considered an edge pixel by considering the neighboring input blocks. It should be noted that this exception or option may depend on a particular application or implementation of the SRE.

If the transition pixel meets the requirements described above, the transition pixel may be identified as an edge pixel. Each transition pixel may be analyzed by the data analyzer 104 until all of the edge pixels are identified. The data analyzer 104, the block selector 106 and the encoder 108 may then perform SRE analysis and processing as described in U.S. Pat. No. 7,636,480 assigned to Xerox® Corporation, the disclosure of which is herein incorporated by reference in its entirety.

In one embodiment, the library 110 may be a computer readable storage medium that stores the various patterns of input blocks used by the SRE encoding. The number of the input blocks may vary depending on a desired compression of a high resolution image.

In one embodiment, the rendering device 112 may be a display device or a marking engine. The marking engine may include devices, such as for example, an ink jet printer, a xerographic or electrophotographic marking engine or printer, and the like.

In one embodiment, although the input 102 is a high resolution image or document with non-saturated objects, the SRE may be performed with saturated pixels. As noted above, SRE was previously only used with objects with fully saturated pixels. SRE was not applied to high resolution images or documents with unsaturated pixels due to the very large or infinite combinations of input blocks based on varying gray level values for each pixel within the input block and limited bits available for SRE encoding.

Figure 2A:
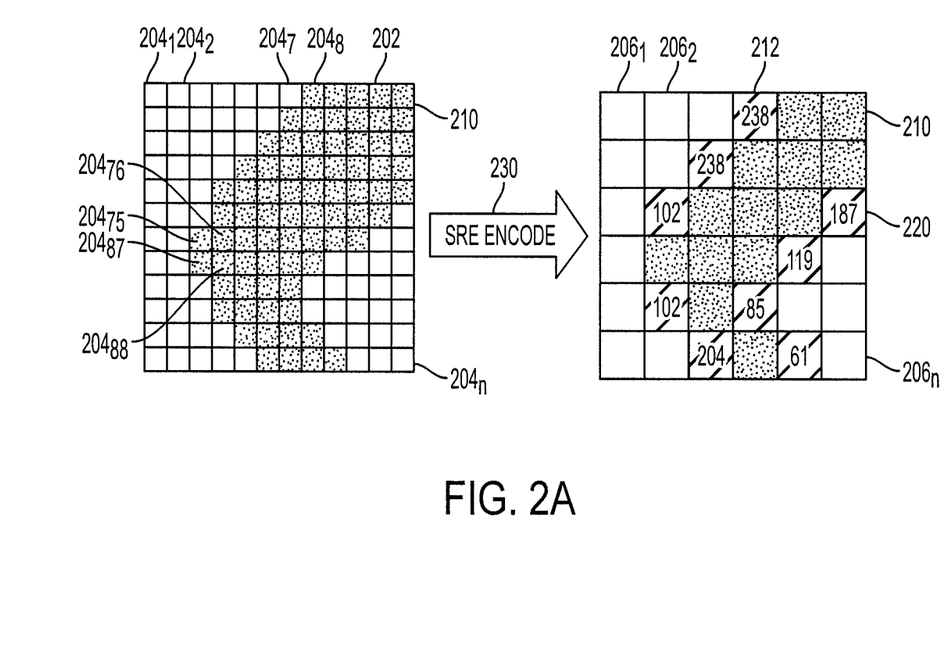
FIGS. 2A-2C illustrates an example edge enhancement of a non-saturated object.
Figure 2B:
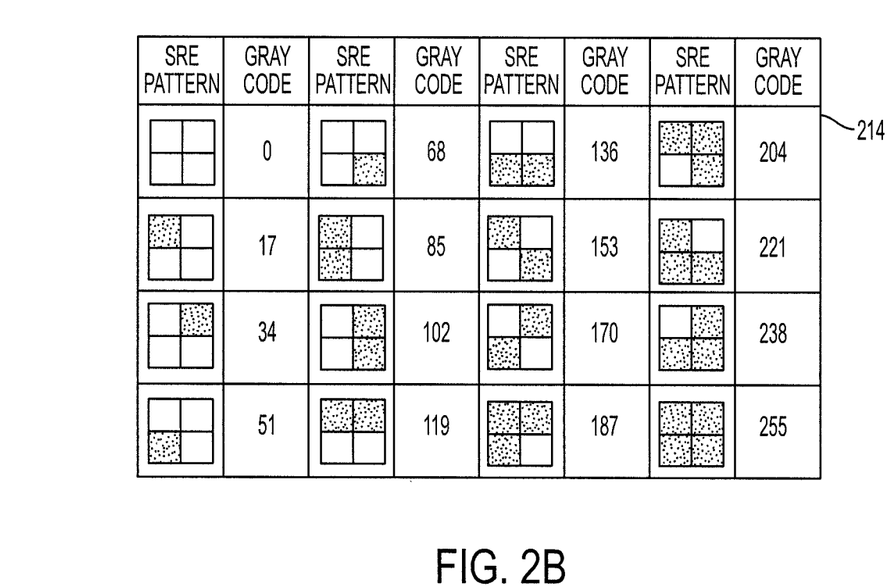
Figure 2C:
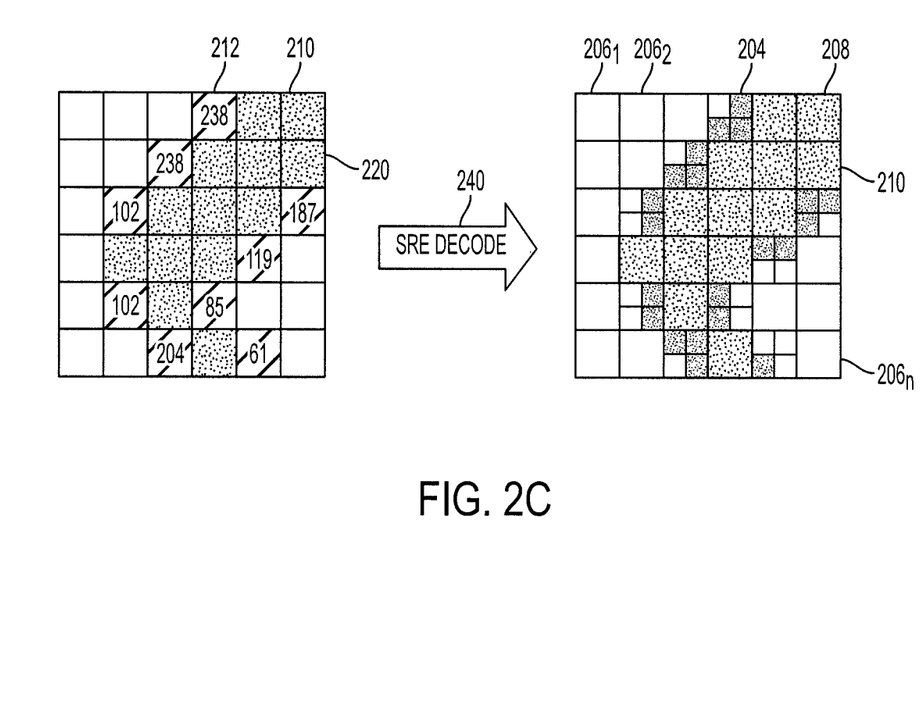

However, one embodiment of the present disclosure leverages the SRE edge enhancement by simplifying the combination of input blocks for unsaturated objects by converting the gray value of edge pixels of the unsaturated object from less than fully on to fully on (e.g., for an 8 bit pixel converting a pixel of a gray value of 170 to a gray value of 255). FIGS. 2A-2C illustrates an example of SRE performed on an unsaturated object.

In FIG. 2A, an unsaturated object 210 of a high resolution image 202 is shown that previously could not have SRE applied. The high resolution image 202 includes a plurality of high resolution pixels $204_1$ to $204_n$ (herein also referred to as a pixel or pixels 204). In one embodiment for an 8-bit object, each one of the pixels 204 of the unsaturated object 210 may include a gray value between 0 and 254. It should be noted that 8 bits is only used as an example and that the object may be any number of bits.

As discussed above, the data analyzer 104 may analyze each pixel 204 on a pixel-by-pixel and line-by-line basis to detect the transition pixels. As noted above, a transition pixel may be defined as a pixel having a gray value greater than zero that immediately follows or precedes a pixel having a gray value of zero. For example, the pixel $204_8$ may be considered a transition pixel because it has a gray value greater than zero and immediately follows pixel $204_7$ that has a gray value of zero.

The data analyzer 104 may then identify which one of the transition pixels are edge pixels. As noted above, an edge pixel may be defined as a transition pixel having a gray value that is greater than a threshold value and also not be part of an input block that has all of its pixels turned on. For example, in FIG. 2 the input block for the SRE may be a 2×2 block. In one embodiment, each input block may not have overlapping pixels within adjacent input blocks. It should be noted that input blocks are not restricted to 2×2 for SRE. Appropriate screens may need to be used for SRE encoding for higher resolutions (e.g., a 4×4 block and higher). The transition pixel $204_8$ has a gray value greater than a threshold value and is part of an input block that has only 3 out of 4 of the high resolution pixels on. Thus, the transition pixel $204_8$ may be identified as an edge pixel.

In contrast, the transition pixels $204_{75}$ and $204_{87}$ may each have a gray value greater than the threshold value, but are part of an input block that also includes pixels $204_{76}$ and $204_{88}$, which are both also on. Thus, the transition pixels $204_{75}$ and $204_{87}$ are part of an input block that has all of the pixels within the input block on, resulting in the transition pixels $204_{75}$ and $204_{87}$ not being identified as edge pixels. However as noted above, for some applications it may be desirable to label all input blocks with transition pixels as an edge pixel for smoother edges.

Once all of the edge pixels are identified, SRE encoding 230 may be applied to the unsaturated object 210 of the high resolution image 202. FIG. 2A illustrates an SRE encoded image 220 of the unsaturated object 210. For example, the unsaturated object 210 may be downsampled into lower resolution output blocks $206_1$ to $206_n$ (also referred to herein as output block 206). Each one of the output blocks 206 with an edge pixel is coded with a gray code value from a SRE pattern look up table 214, illustrated in FIG. 2B, based on a pixel pattern of the input block. In one embodiment, the SRE pattern look up table may be stored in the library 110 illustrated in FIG. 1.

For example, each pattern of pixels for an input block of an 8 bit object is included in the SRE pattern look up table 214. There may be separate tag data that will indicate which input blocks were SRE encoded. It should be noted that the SRE pattern look up table 214 may be expanded for objects having larger bit sizes. Thus, the SRE pattern look up table 214 is only an example table for 8 bit objects. In addition, the gray values associated with each bit pattern are only examples and may be varied. The SRE encoded image 220 has the edge pixels at the same lowered resolution space as non edge pixels at this point. Also, it should be noted that the above is an example of a 2×2 block SRE pattern look up. As mentioned above, the SRE pattern lookup may not be restricted to a 2×2 block, but may also be done on a 4×4 block or higher.

When the SRE encoded image 220 reaches an output terminal (e.g., a printer or the rendering device 112), SRE decoding 240 is performed and the edge pixels encoded with a gray code value are recognized as edge pixels via a tag channel and decoded back into high resolution pixels 204 and converted into fully saturated pixels, thus recovering the original edge definitions.

FIG. 2C illustrates an image 208 after SRE decoding 240. Each one of the non-edge pixels are downsampled into the lower resolution output block blocks 206.

The gray value of the edge pixels is converted into a fully on or a fully saturated pixel. For example, in FIG. 2C if the edge pixels had a gray value of 175 out a maximum gray value of 255 for an 8-bit object, after SRE processing the edge pixels would have the maximum gray value of 255. The SRE processing is simplified by converting all edge pixels of an unsaturated object 210 into edge pixels that are fully saturated, thereby, eliminating all of the possible combinations of possible input blocks for varying gray levels of each pixel within the input block.

The remaining non-edge pixels are downsampled into the output blocks 206 and the gray value from the high resolution pixels 204 is maintained. In other words, the gray value of the output blocks 206 may remain the same as the gray value of the high resolution pixels 204.

Although FIGS. 2A-2C illustrates SRE edge enhancement on an object in terms of gray values, the embodiments of the present disclosure may also be applied to color objects. For example, the edge enhancement described herein may also be applied to objects having pixels within the cyan, yellow, magenta and key (CYMK) color model.

In one embodiment, for colored pixels, the threshold value may be a weighted value based on each one of a plurality of different colors (e.g., CYMK). In one embodiment, higher weighting may be given to the darker colors. For example, in a CYMK color model a higher weighting may be given to the key and a lower weighting may be given to the yellow for enhancement. Thus, a color value for each edge pixel identified, as described above, may be compared to the weighted threshold value to determine whether SRE edge enhancement should be applied, as discussed above.

Figure 3:
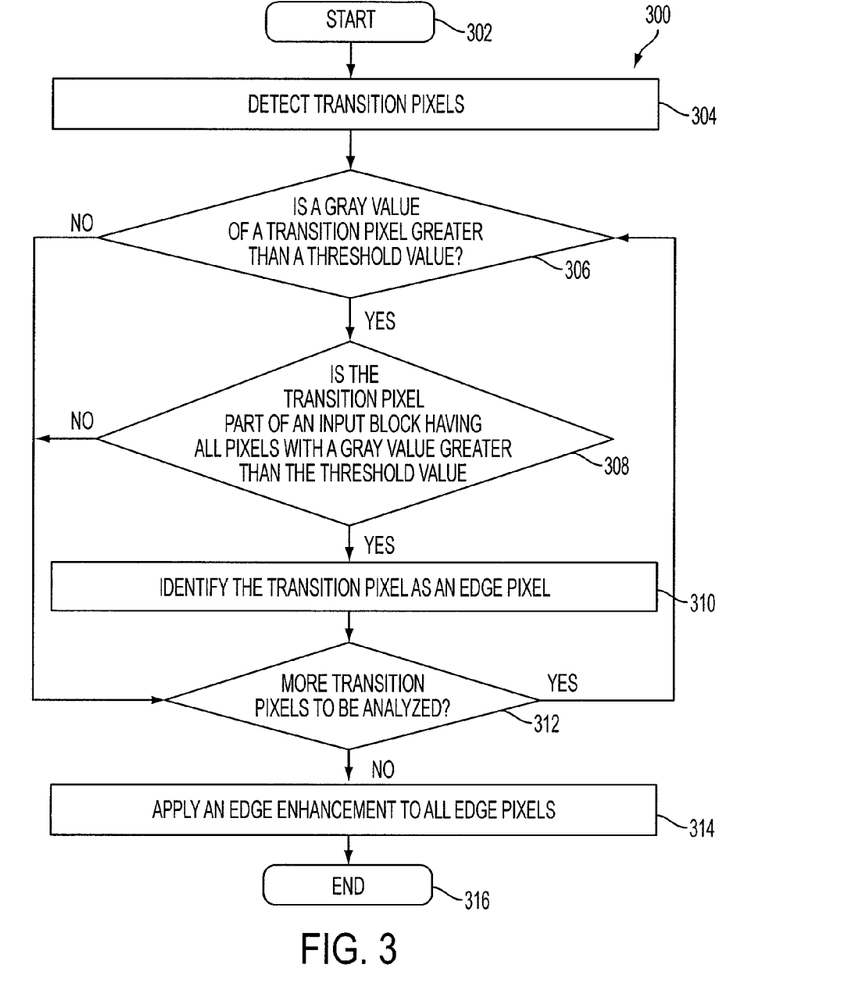
FIG. 3 illustrates an example flowchart of one embodiment of a method for enhancing an edge of a non-saturated object.
Figure 4:
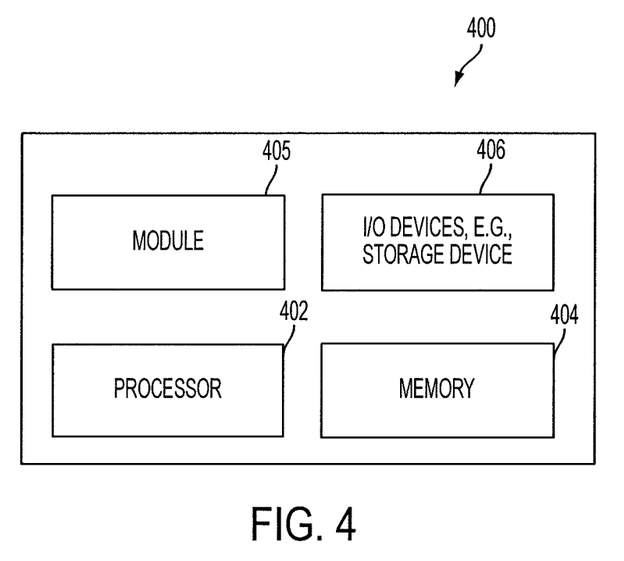
FIG. 4 illustrates a high-level block diagram of a general-purpose computer suitable for use in performing the functions described herein.

FIG. 3 illustrates a flowchart of a method 300 for enhancing an edge of a non-saturated object. In one embodiment, one or more steps or operations of the method 300 may be performed by the apparatus 114 or a general-purpose computer as illustrated in FIG. 4 and discussed below.

At step 302 the method 300 begins. At step 304, the method 300 detects a transition pixel. For example, an image may be received having unsaturated objects that are contone. In one embodiment, each one of the pixels may have a gray value between 0 and 254 for an 8 bit pixel. The image may be analyzed pixel-by-pixel and line-by-line. A transition pixel may be identified as a pixel having a gray value greater than zero that immediately follows or precedes a pixel having a gray value of zero. In other words, transition pixels are pixels that have a gray value greater than zero and are adjacent to another pixel having a gray value of zero. In one embodiment, the image may be analyzed to detect a plurality of transition pixels.

At step 306, the method 300 determines if a gray value of a transition pixel is greater than a threshold value. For each transition pixel that is detected in step 302, the respective gray value for each transition pixel may be compared against the threshold value.

In one embodiment, the threshold value may be user defined. The threshold value may be a gray value that is determined to be dark enough such that providing edge enhancement may not appear as a border around the object. In one embodiment, the threshold value may be a gray value of 210 for an 8 bit pixel. It should be noted that threshold value may be adjusted accordingly for pixels with more or less bits having a smaller or wider range of gray values.

In another embodiment, multiple levels of edge enhancement may be applied. As a result, a second threshold value may be used for higher levels of edge enhancement. In one embodiment, the threshold value may be a gray value of 165 for an 8 bit pixel.

If the gray value of the transition pixel is less than or equal to the threshold value, the method 300 may proceed to step 312. However, if the gray value of the transition pixel is greater than the threshold value, the method 300 may proceed to step 308.

At step 308, the method 300 determines if the transition pixel is part of an input block having all pixels with a gray value greater than the threshold value. In one embodiment, the SRE algorithm may not consider a transition pixel as an edge pixel that is part of an input block in which all of the pixels within the input block are on.

For example, consider an input block consisting of a 2 pixel×2 pixel block. One of the pixels may have been identified as a transition pixel and has a gray value greater than the threshold value. However, if all of the remaining three pixels also have a gray value greater than the threshold value then all of the pixels are considered to be on and the transition pixel would not be identified as an edge pixel. Thus, edge enhancement would not be applied to the transition pixel or any other transition pixel within the input block. If all of the pixels within the input block of the transition pixel are on, then the answer to step 308 is no and the method 300 proceeds to step 312. However, if the input block has at least one other pixel that has a gray value of zero or below the threshold value, then the answer to step 308 is yes and the method 300 proceeds to step 310.

At step 310, the method 300 identifies the transition pixel as an edge pixel. For example, the transition pixel that is being analyzed has a dark enough gray value according to the comparison to the threshold value and is not within an input block having all pixels that are on. As a result, the transition pixel is identified as an edge pixel.

At step 312, the method 300 determines if there are more transition pixels to be analyzed. For example, the method 300 may be repeated until all of the transition pixels detected at step 304 are analyzed to determine if they are an edge pixel. If there are more transition pixels, the method 300 may return to step 306 to analyze the next transition pixel. However, if there are no more transition pixels, the method 300 may proceed to step 314.

At step 314, the method 300 applies an edge enhancement to all of the edge pixels. For example, the SRE edge enhancement may be applied to each input block identified as eligible for SRE in step 310. The SRE edge enhancement may convert the gray value of the edge pixel to a fully saturated gray value (e.g., 255 for an 8 bit pixel) and use a pattern lookup table to encode the edge into appropriate SRE gray values and tag it as an SRE pixel. The SRE edge enhancement provides an appearance of smoothness of an edge of the non-saturated object. The SRE edge enhancement is applied to objects having pixels that are dark enough based upon the threshold value such that the edge enhancement does not appear to be a border around the object, which may be undesirable. At step 316, the method 300 ends.

It should be noted that although not explicitly specified, one or more steps, functions, or operations of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 3 that recite a determining operation, or involve a decision, do not necessarily require that both branches of the determining operation be practiced. In other words, one of the branches of the determining operation can be deemed as an optional step.

FIG. 4 depicts a high-level block diagram of a general-purpose computer suitable for use in performing the functions described herein. As depicted in FIG. 4, the system 400 comprises one or more hardware processor elements 402 (e.g., a central processing unit (CPU), a microprocessor, or a multi-core processor), a memory 404, e.g., random access memory (RAM) and/or read only memory (ROM), a module 405 for enhancing an edge of a non-saturated object, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 405 for enhancing an edge of a non-saturated object (e.g., a software program comprising computer-executable instructions) can be loaded into memory 404 and executed by hardware processor element 402 to implement the steps, functions or operations as discussed above in connection with the exemplary method 300. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for enhancing an edge of a non-saturated object (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for enhancing an edge of a non-saturated object, comprising:
   detecting, by a processor, a plurality of transition pixels;
   determining, by the processor, a gray value for one or more of the plurality of transition pixels is greater than a threshold value;
   identifying, by the processor, one or more edge pixels from the one or more of the plurality of transition pixels that have the gray value greater than the threshold value when the one or more of the plurality of transition pixels are not within an input block of pixels having all of the pixels in the input block with a respective gray value greater than the threshold;
   replacing, by the processor, each input block of a plurality of input blocks associated with the one or more edge pixels that are identified with a pre-defined super resolution encoding (SRE) pattern of pixels; and
   converting, by the processor, each one of the one or more edge pixels to a saturated pixel.

2. The method of claim 1, wherein the plurality of transition pixels comprises pixels that have a respective gray value greater than a gray value of an adjacent pixel.

3. The method of claim 2, wherein the adjacent pixel has a value of zero.

4. The method of claim 1, wherein the gray value is less than 255.

5. The method of claim 1, wherein the converting comprises changing the gray value of each one of the one or more edge pixels to a value of 255.

6. The method of claim 1, wherein the threshold value comprises a plurality of threshold values.

7. The method of claim 1, wherein the threshold value comprises a weighted value based on each one of a plurality of different colors, wherein a higher weighting is given to darker colors of the plurality of different colors.

8. A non-transitory computer-readable medium storing a plurality of instructions which, when executed by a processor of an endpoint device, cause the processor to perform operations for enhancing an edge of a non-saturated object, the operations comprising:
   detecting a plurality of transition pixels;
   determining a gray value for one or more of the plurality of transition pixels is greater than a threshold value;
   identifying one or more edge pixels from the one or more of the plurality of transition pixels that have the gray value greater than the threshold value when the one or more of the plurality of transition pixels are not within an input block of pixels having all of the pixels in the input block with a respective gray value greater than the threshold;
   replacing each input block of a plurality of input blocks associated with the one or more edge pixels that are identified with a pre-defined super resolution encoding (SRE) pattern of pixels; and
   converting each one of the one or more edge pixels to a saturated pixel.

9. The non-transitory computer-readable medium of claim 8, wherein the plurality of transition pixels comprises pixels that have a respective gray value greater than a gray value of an adjacent pixel.

10. The non-transitory computer-readable medium of claim 9, wherein the adjacent pixel has a value of zero.

11. The non-transitory computer-readable medium of claim 8, wherein the gray value is less than 255.

12. The non-transitory computer-readable medium of claim 8, wherein the converting comprises changing the gray value of each one of the one or more edge pixels to a value of 255.

13. The non-transitory computer-readable medium of claim 8, wherein the threshold value comprises a plurality of threshold values.

14. The non-transitory computer-readable medium of claim 8, wherein the threshold value comprises a weighted value based on each one of a plurality of different colors, wherein a higher weighting is given to darker colors of the plurality of different colors.

15. A method for enhancing an edge of a non-saturated object, comprising:
   receiving, by a processor, an image comprising an contone object, wherein the contone object comprises a plurality of pixels each having a gray value between 0 and 255;
   analyzing, by the processor, each one of the plurality of pixels on a line-by-line basis;
   detecting, by the processor, a plurality of transition pixels based on the analyzing, wherein each one of the plurality of transition pixels comprises one or more of the plurality of pixels that have a respective gray value greater than zero and are after an adjacent pixel having a gray value of 0;
   determining, by the processor, a gray value for one or more of the plurality of transition pixels is greater than a threshold value;
   identifying, by the processor, one or more edge pixels from the one or more of the plurality of transition pixels that have the gray value greater than the threshold value when the one or more of the plurality of transition pixels are not within an input block of pixels having all of the pixels in the input block with a respective gray value greater than the threshold;
   replacing, by the processor, each input block of a plurality of input blocks associated with the one or more edge pixels that are identified with a pre-defined super resolution encoding (SRE) pattern of pixels; and
   converting, by the processor, each one of the one or more edge pixels to a saturated gray value of 255.

16. The method of claim 15, wherein the threshold value comprises a weighted value based on each one of a plurality of different colors, wherein a higher weighting is given to darker colors of the plurality of different colors.

* * * * *